SELF-BIASED SOLID STATE RF SWITCH

Filed Nov. 14, 1968 2 Sheets-Sheet 1

Robert C. Houlne
INVENTOR.

BY John M. Pearce

Attorney

Robert C. Houlne
INVENTOR.

BY John M. [signature]
Attorney

United States Patent Office 3,525,878
Patented Aug. 25, 1970

3,525,878

SELF-BIASED SOLID STATE RF SWITCH

Robert C. Houlne, McLean, Va., assignor, by mesne assignments, to the United States of America as represented by the Secretary of the Navy Filed Nov. 14, 1968, Ser. No. 775,676
Int. Cl. H03k *17/74, 19/16*
U.S. Cl. 307—88 6 Claims

ABSTRACT OF THE DISCLOSURE

For use with a very low radio frequency circuit including an RF source and a load connected thereto, an improved full wave SCR switch means employing circuit load current passing through a saturable core transformer together with suitably arranged steering diodes to provide a self generated bias in the form of regeneration to maintain a pair of switching SCR's in "ON" condition and a control winding operable to saturate the transformer core to remove the "ON" bias effect and allow the SCR to commutate to "OFF" condition.

BACKGROUND OF THE INVENTION

The invention herein relates to the field of electronics and in particular to the provision of improved switch means for very low frequency radio frequency circuits.

SCR switches can be employed as switch means in RF circuits. However, a basic back-to-back silicon controlled rectifier switch presents an inherent problem, which prevents it from operating efficiently at VLF (very low frequency). By VLF in this instance is contemplated frequencies below 50 kc. This inherent problem is that the current does not have sufficient time in one-half of the RF cycle to spread over the entire SCR junction area. Because of this, the forward voltage drop across the SCR is high, resulting in high dissipation which limits the kva. that can be controlled.

It is known that it is feasible to operate an SCR switch at its AC rating by using either D.C. (direct current) or H.F. (high frequency) bias. However, in either case, an external power supply would be required. Of the two bias methods, D.C. bias is the most efficient means of biasing. However, approximaely 90% of the bias power generated is dissipated in current limiting resistors. Also because of the size of the bias supply required, the supply has to be remotely located and connected to the switches by long high current capacity wires.

SUMMARY OF THE INVENTION

A solution to the problems stated above in accordance with my invention is to use self generated bias, which is in the form of regeneration. In particular two SCR's are connected in two parallel branch circuits across the combination of an RF source and load. The current flowing in one branch, which is forward biased by the RF source, is used to generate a bias or holding current in the other branch, by means of a current transformer. The same saturable core is used for both branches, and is connected so that there is no D.C. flux in the core due to the half wave current flowing in each of the primaries. A control winding on the current transformer is used to saturate the transformer when the switch is to be turned off.

DESCRIPTION OF THE PREFERRED EMBODIMENT

Figure 1:
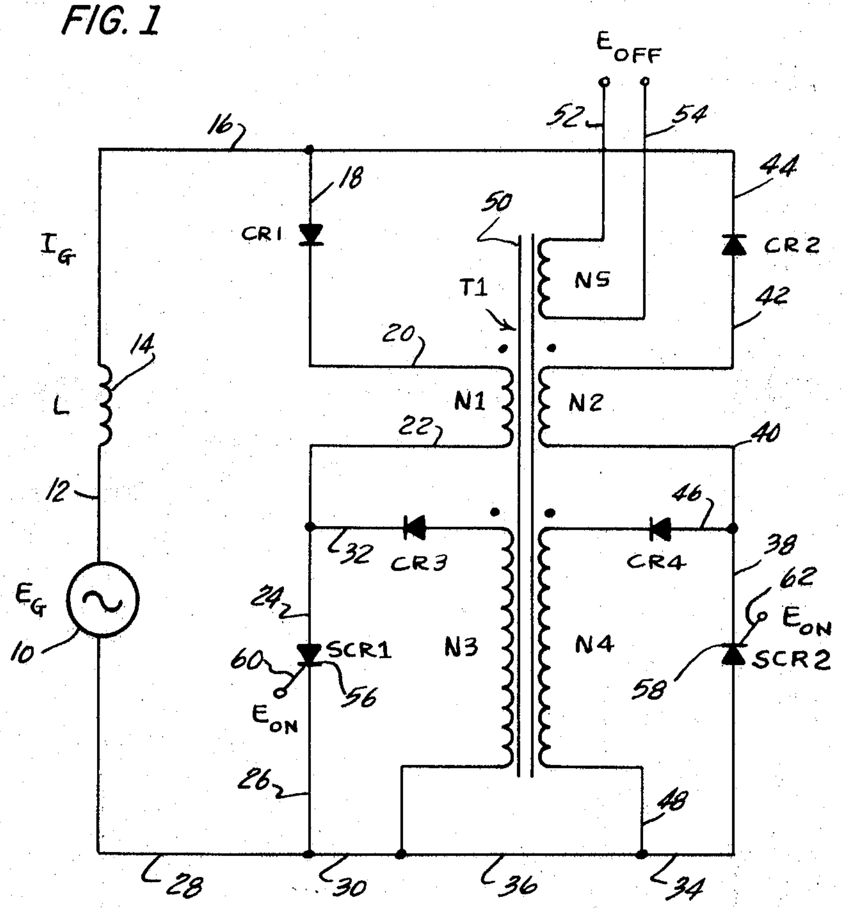
FIG. 1 shows schematically an electrical circuit embodying the invention.

Referring to FIG. 1 of the drawing, numeral 10 indicates a radio frequency (RF) source connected through line 12 to a load indicated at 14. The load 14 shown in FIG. 1 is an induction load, it being understood that the circuit will work equally well with any other type of load.

The remainder of the circuit in FIG. 1 is the switching circuit arranged in two parallel branches across the combination of the RF source 10 and the load 14. Each branch circuit includes an SCR connected in series with a transformer primary coil and a steering diode together with a transformer secondary coil and associated steering diode connected in series and across its associated SCR.

Thus, in one branch circuit the load 14 is connected through lines 16 and 18, a diode CR1 and line 20 to a primary coil N1 of a transformer indicated generally at T1 and the coil N1 is connected through lines 22 and 24, an SCR1 and lines 26 and 28 to the RF source 10. A secondary coil N3 of transformer T1 is connected by line 30 to the cathode side of SCR1 and through a diode CR3 and lines 32 and 24 to the anode side of SCR1. Steering diode CR1 is directed to pass load current from the load 14 to the anode side of SCR1 and steering diode CR3 is directed to pass holding current from coil N3 to the anode side of SCR1.

In the second branch circuit the anode of an SCR2 is connected by lines 34, 36, 30, and 28 to the RF source 10. The cathode side of SCR2 is connected through lines 38 and 40, a primary coil N2, line 42, a steering diode CR2, and lines 44 and 16 to load 14 to pass load current from SCR2 through a primary coil N2 of transformer T1 and through a steering diode CR2 to the load 14. A secondary coil N4 of transformer T1 and a steering diode CR4 are connected in series and by lines 38, 46, 48, and 34 across the SCR2. The steering diode CR4 is directed to pass holding current from coil N4 to the anode side of SCR2, and steering diode CR2 is directed to pass load current from the RF source to the load 14.

The same saturable core 50 of transformer T1 is used for both branch circuits and the coils N1, N2, N3, and N4 are connected in matching polarity so that there is no D.C. flux in the core 50 due to the half wave current flowing in each of the primaries N1 and N2. A control coil N5 is arranged for connection by lines 52 and 54 to a "turn off" pulse $E_{OFF}$ indicated to saturate the transformer T1 when the switch circuit is to be turned off. Gates 56 and 58 of respective SCR1 and SCR2 rectifiers are connected respectively by lines 60 and 62 to respective sources of trigger pulses $E_{ON}$ indicated.

Figure 2:
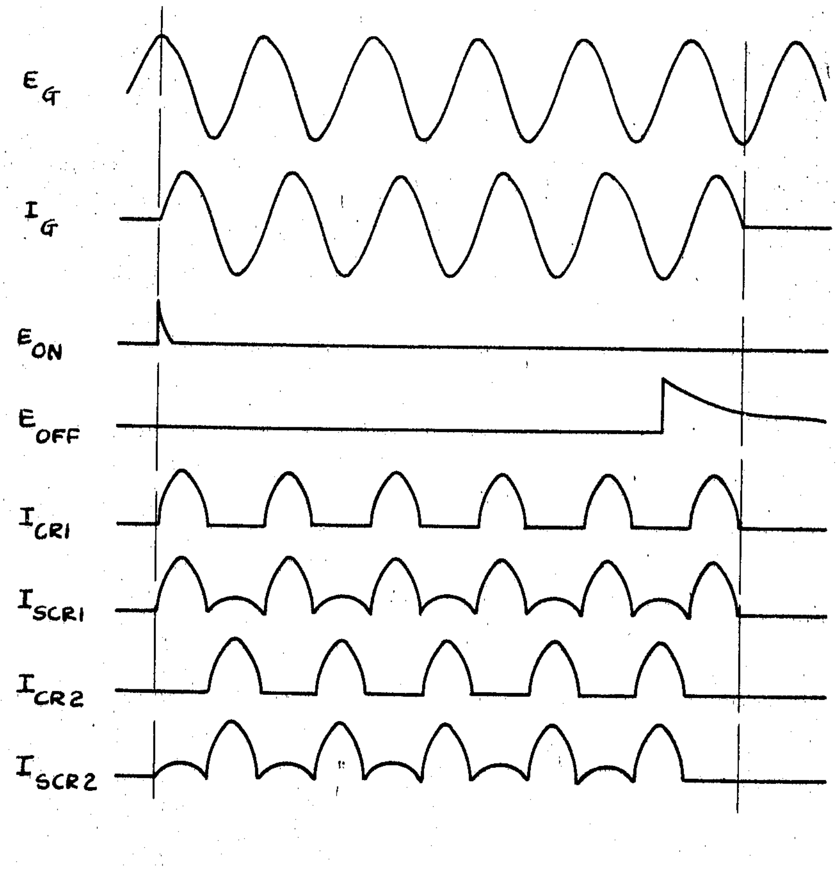
FIG. 2 shows several wave forms of voltage, pulse, and currents used to explain the operation of the circuit of FIG. 1.

In operation, the RF switch described hereinbefore has two states, open and closed. To turn the switch "ON" a trigger pulse is applied to both gates of the SCR1 and SCR2 rectifiers when the generator voltage (see curve $E_G$, FIG. 2) is maximum. Current (see curve $I_G$, FIG. 2) will then flow through CR1, N1, and SCR1. Diode CR3 prevents current from flowing through coil N3. Since SCR2 is also gated "ON," the current flowing in N1 (see curve $I_{CR1}$, FIG. 2) will generate a voltage by way of coils N1 and N4 which will provide a small holding current (see curve $I_{SCR2}$, FIG. 2), which is equal to $(N1/44)I_{CR1}$, to flow through SCR2 and CR4. Diode CR2 is back biased, preventing current from flowing through it.

On the next half cycle the generator current flows through SCR2, N2, and CR2. The current flowing in N2 (see curve $I_{CR2}$, FIG. 2) generates a holding current (see curve $I_{SCR1}$, FIG. 2) flow in SCR1 through CR3 from coil N3. Diode CR1 is now back biased and blocks current as CR2 did on the previous half cycle. The current transformer T1, is connected such that there is only A.C. flux in the core, although each winding is carrying a half sine wave current. This technique prevents the core from becoming saturated. The above process is repeated every RF cycle until a "turn off" pulse is applied to the control coil, N5. The "turn off" pulse saturates the transformer core 50, preventing holding current from flowing in the secondary coils, N3 and N4. With the holding current removed, the switch will turn off in the next RF cycle by commutation of SCR1 and SCR2.

It will be understood that various changes in the details, materials, and arrangements of parts and steps, which have been herein described and illustrated in order to explain the nature of the invention, may be made by those skilled in the art within the principle and scope of the invention as expressed in the appended claims.

It is claimed:

1. In a VLF radio frequency circuit including an RF source and a load connected thereto, switch means including:

(a) transformer means including a first set of primary and secondary coils and a second set of primary and secondary coils;

(b) a first SCR and a first steering diode connected to pass current from said load to said RF source one of said primary coils on one-half cycle operation;

(c) a second SCR and a second steering diode connected to pass current from said RF source to said load through the second of said primary coils on the other half cycle operation;

(d) means for connecting the gates of each of said SCR's to a trigger pulse source to initially bias said SCR's to ON condition;

(e) means including a third steering diode connecting one of said secondary coils in parallel with said first SCR to maintain ON condition in said first SCR responsive to said other half cycle operation through said second primary coil; and (f) means including a fourth steering diode connecting the second of said secondary coils in parallel with said second SCR to maintain ON condition in said second SCR responsive to said one half cycle operation through said first primary coil.

2. Switch means according to claim 1, (a) said transformer means having a saturable core; and (b) said switch means including a control winding mounted on said core and having means for connection to a pulse source to saturate said core rendering said primary and secondary coils ineffective to hold said SCR's in ON condition.

3. Switch means according to claim 1, (a) said transformer means having a common core for said sets of coils.

4. Switch means according to claim 3, (a) said coil sets being mounted on said common core in matching polarity so that the average D.C. flux in said core is zero responsive to a half wave current flowing in each of said primaries.

5. Switch means according to claim 2, (a) said transformer means having a common core for said sets of coils.

6. Switch means according to claim 5, (a) said coil sets being mounted on said common core in matching polarity so that the average D.C. flux in said core is zero responsive to a half wave current flowing in each of said primaries.

References Cited

UNITED STATES PATENTS 2,709,225 5/1955 Pressman.
2,977,481 3/1961 Rosa.

JAMES W. MOFFITT, Primary Examiner